LEWIS & BAIRD.
Preventative of Retrograde Motion in Sewing Machines.
No. 39,236. Patented July 14, 1863.
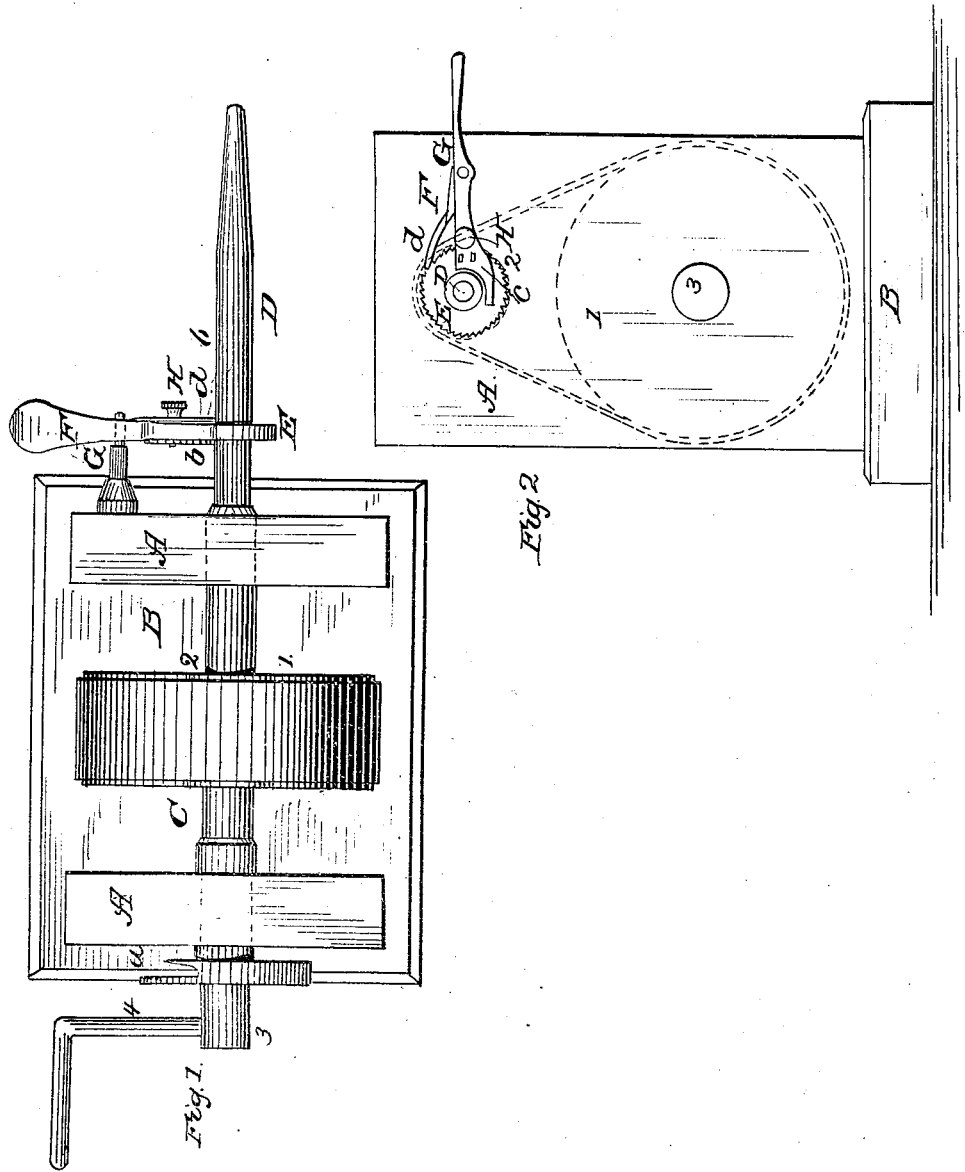
Witnesses
Horace B. Peck
John McPaul
Inventors
Wm. Lewis
Jo. H. Baird

UNITED STATES PATENT OFFICE.

WM. F. LEWIS, OF WATERTOWN, AND JOSEPH H. BAIRD, OF WATERBURY, CONNECTICUT.

IMPROVEMENT IN DEVICES FOR PREVENTING RETROGRADE MOTION IN SEWING-MACHINES.

Specification forming part of Letters Patent 39,236, dated July 14, 1863.

*To all whom it may concern:*

Be it known that we, WILLIAM F. LEWIS, of Watertown, in the county of Litchfield, and JOSEPH H. BAIRD, of Waterbury, in the county of New Haven, and State of Connecticut, have invented a new and Improved Automatic Stop to Prevent Retrograde Motion in Sewing-Machines; and we do hereby declare the following to be a full, clear, and exact description thereof, reference being had to the accompanying drawings, figures, and letters of reference, making part of this specification.

Of the said drawings, Figure 1 is a top view, and Fig. 2 an end elevation.

Similar letters of reference indicate like parts in both drawings.

In machines using a rotating hook, like the A. B. Wilson machine, much trouble is experienced, particularly when learning to use the machine, from the retrograde motion of the hook, which breaks the thread, causing it frequently to snarl and break the needle.

The object of our invention is to prevent this difficulty; and it consists in the employment, in combination with a rotating hook, of a ratchet-wheel and friction-pawl.

To enable others skilled in the art to make and use our invention, we will describe the construction and operation thereof.

A A represent standards secured to a base, B, in which standards is a cranked shaft, 3, provided with a pulley, 1, and belt for driving the hook-pulley 2. The rotating hook $a$ has its bearings in the standard, and has a spindle, D, for filling the under spool with thread. On this spindle or the end of the hook, if long enough, we secure a small ratchet-wheel, E.

To the standard A we secure a pin, G, upon which the lever F, provided with a pawl, $d$, has its fulcrum. The parts $b\ b$ of the lever F consist of thin metal plates embracing the ratchet-wheel on both sides, which readily yield, and they may be provided with a friction surface, $c$, of leather or similar material, and the friction of the same on the sides of the ratchet-wheel E is regulated by means of the screw H.

The operation will be as follows: The hook being driven in the proper direction, the friction of the parts $b\ b$ of the lever F on the sides of the ratchet-wheel E will lift the lever and pawl $d$ until that part of the lever F which projects under the spindles strikes and prevents a further rise. A slight reverse motion of the hook will draw the ratchet-lever F and pawl $d$ upon the teeth of the wheel and prevent backward motion of the hook. Should it be necessary to turn the hook backward, it is only necessary to press upon the flat part of the lever F slightly, which will raise the pawl $d$ from the teeth of the wheel and admit the backward motion.

We claim—

The combination, with a rotating hooked mandrel, C, for carrying the thread around a bobbin, of a ratchet-wheel, E, and friction-lever F, provided with a pawl, $d$, constructed, arranged, and operating substantially as described, and for the purposes set forth.

WM. F. LEWIS.
JOS. H. BAIRD.

Witnesses:
JOHN W. PENEL,
HORACE B. PECK.